United States Patent

Russo

[11] 4,384,763
[45] May 24, 1983

[54] DOUBLE LAYER LIQUID CRYSTAL DEVICE FOR A DOT MATRIX DISPLAY

[75] Inventor: Paul M. Russo, Princeton, N.J.

[73] Assignee: RCA Corporation, New York, N.Y.

[21] Appl. No.: 181,424

[22] Filed: Aug. 26, 1980

[51] Int. Cl.³ ............................................... G02F 1/13
[52] U.S. Cl. .................... 350/335; 350/333; 350/336
[58] Field of Search ............... 350/333, 334, 335, 336, 350/331 R

[56] References Cited

U.S. PATENT DOCUMENTS

| | | |
|---|---|---|
| 3,674,342 | 7/1972 | Castellano et al. ............... 350/336 |
| 3,885,861 | 5/1975 | Farnsworth et al. . |
| 3,989,355 | 11/1976 | Wilmer ............... 350/335 |
| 4,099,855 | 7/1978 | Wisbey et al. ............... 350/333 |
| 4,139,278 | 2/1979 | Matsumoto et al. . |
| 4,289,383 | 9/1981 | Schwarzschild ............... 350/334 |

FOREIGN PATENT DOCUMENTS 421971 9/1974 U.S.S.R. ............... 350/336

*Primary Examiner*—John K. Corbin
*Assistant Examiner*—Richard F. Gallivan
*Attorney, Agent, or Firm*—Birgit E. Morris; Donald S. Cohen; Joseph D. Lazar

[57] ABSTRACT

A liquid crystal device (LCD) for displaying a dot matrix is formed of a pair of LCD's in back-to-back relation. Conductive bar pattern coatings are provided on each of the LCD's. Each LCD pattern is orthogonally oriented to the pattern of the other LCD to define thereby a dot matrix in a row and column array. The electrically conducting patterns are energized with control signals to activate the liquid crystal compositions in the respective LCD's to transmit light through two spatially superposed vertical dots to provide a display of dots in accordance with the selected energization signals.

6 Claims, 3 Drawing Figures

DOUBLE LAYER LIQUID CRYSTAL DEVICE FOR A DOT MATRIX DISPLAY

BACKGROUND OF THE INVENTION

This invention relates to liquid crystal devices and, more particularly, to liquid crystal devices useful for dot matrix displays.

Liquid crystal devices are useful for display purposes by their property of passing light when electrically energized and being opaque to light when not energized. They are particularly useful in that very little power is needed to energize them since they merely change the state of passing light which is externally generated or exists in the ambient.

Another device in the display art is a light-emitting diode (LED). The LED which is electrically equivalent to a diode can be arranged in a dot matrix very easily by arranging the LEDs in rows and columns that are energized in a conventional cross-point diode matrix manner. Accordingly, the LED is easy to program to provide a desired dot matrix display. However, the LED requires much more power and voltage for the electrical control than a liquid crystal device (LCD) arranged in a dot matrix, since in the LED the light is generated by the LED itself. Moreover, it is much more difficult to control a dot-matrix liquid crystal display than a light emitting diode dot-matrix display. The reason for this difficulty is primarily due to the lack of the so-called diode isolation effect that is manifested in the LED-type matrix but which cannot be produced between the elements in a conventional liquid crystal display matrix. For example, when a row and column of an LCD matrix are selected, both the entire row and entire column are energized. The conventional way of controlling LCD displays, that is, by assigning a pin to each LCD dot is impractical for complex matrixed displays containing hundreds of dots. In order to reduce the complexity of the circuitry required for providing individual pin connections for each LCD dot, complex clocking schemes must be employed requiring further complex circuitry to develop the required clocking waveforms to energize the LCD matrix to compensate for the absence of the diode isolation effect provided in an LED matrix. Accordingly, there is a need in the art to provide an LCD dot matrix that can essentially operate in a circuit to emulate an LED dot matrix A 2×N LCD matrix control system, for example, is described in U.S. Pat. No. 3,885,861 issued to Farnsworth, et al. on May 27, 1975.

A liquid crystal display device having two layers of LCD cells arranged in a back to back arrangement is disclosed in U.S. Pat. No. 4,139,278 on Feb. 13, 1979 issued to Matsumoto, et al., entitled "Liquid Crystal Display Device." This patent describes (FIGS. 30–40) the pair of liquid crystal cells arranged in superposed relation and disposed between polarizing plates to provide a display that is polarized by the combined effect of controlling the two LCD cells. The pair of LCD cells is sequentially scanned in two orthogonal directions so as to activate any single dot or area for the purpose of converging two lines as in a camera viewfinder. Such an arrangement, however, does not provide for a dot matrix capable of being addressed as an LED dot matrix.

SUMMARY OF THE INVENTION

According to this invention, the liquid crystal device for a dot matrix display is formed of three closely spaced glass plates defining two LCD enclosures therebetween. A conductive coating in a first bar pattern is disposed on each of the facing surfaces of two of the plates and a second bar pattern of a conductive coating is disposed on each of the facing surfaces of the remaining plate surfaces. The patterns are arranged in a spaced orthogonal relationship to each other to provide a dot matrix as viewed from the exposed surfaces of the outer glass plates. Means are provided to be connected to the conductive patterns for energizing a preselected two or more sets of conductors to cause the liquid crystal composition in the enclosures to pass light through both enclosures to display one or more dots according to a preselected pattern.

DETAILED DESCRIPTION OF A PREFERRED EMBODIMENT

Figure 1:
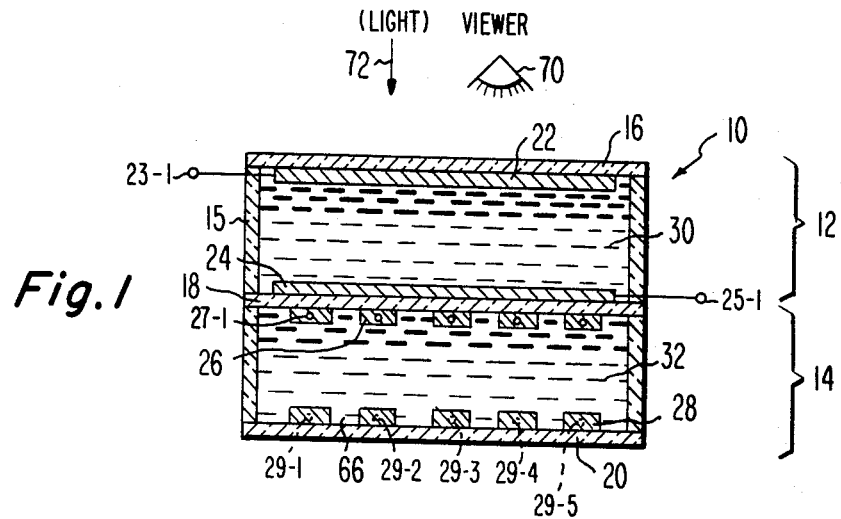
FIG. 1 is a schematic in elevation of a double layer LCD structure in section according to one embodiment of the present invention.
Figure 2:
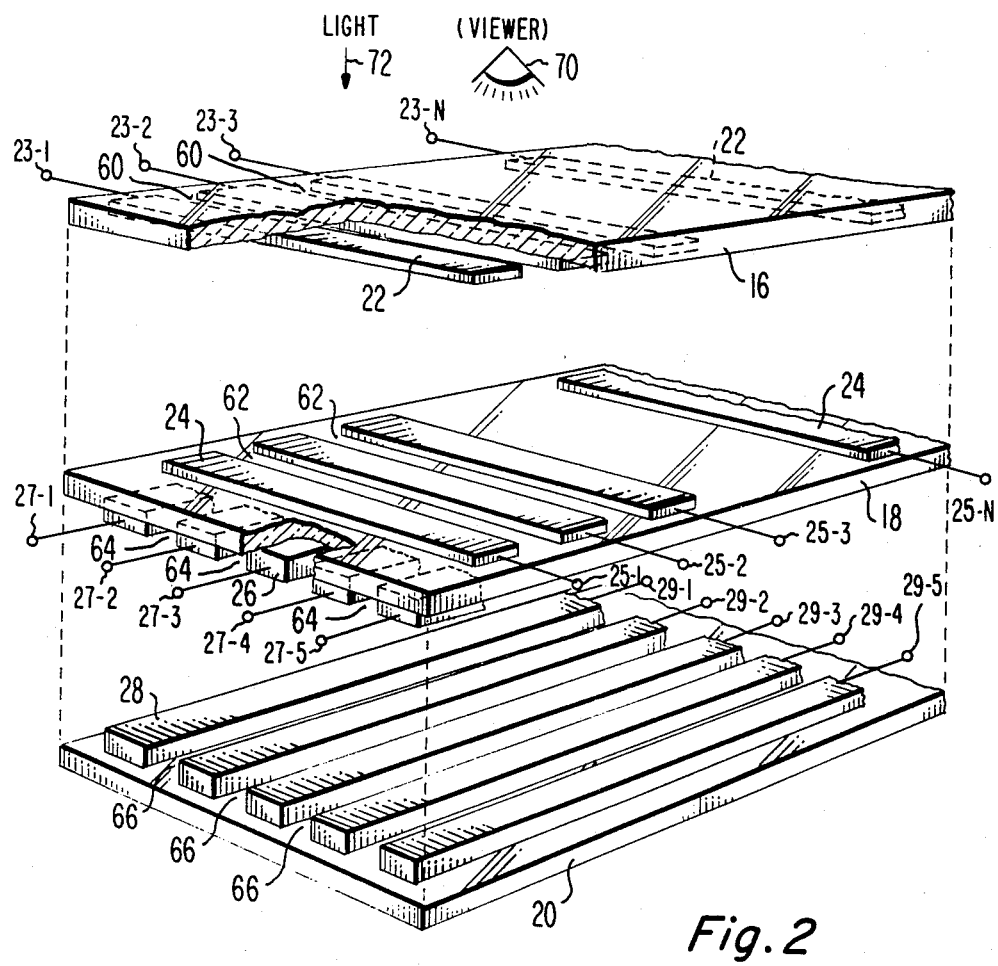
FIG. 2 is a perspective exploded view of the structure illustrated in FIG. 1.
Figure 3:
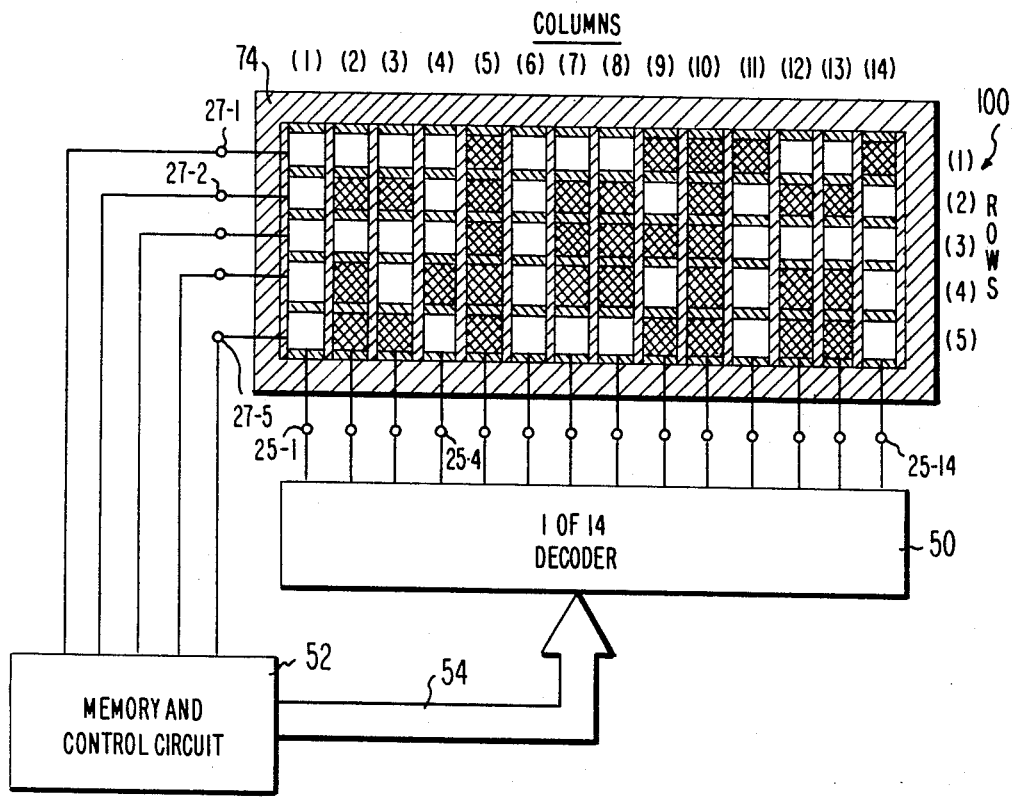
FIG. 3 is a block schematic of a system for operating a double layer LCD dot matrix display according to the present invention.

FIGS. 1 and 2 illustrate a liquid crystal device formed into a two layer structure for developing a dot matrix useful in a system illustrated in FIG. 3.

The two layer LCD dot matrix structure 10 is formed of three glass plates suitably spaced apart to define two independent LCD's 12 and 14. The upper or top layer LCD 12 is formed of a transparent top glass plate 16 and the upper surface of a glass plate 18. The lower or bottom layer LCD 14 is formed by the opposing lower surface of the glass plate 18 and a glass plate 20. Suitable liquid crystal compositions 30 and 32 are disposed in the enclosures defined by the three plates 16, 18 and 20. Suitable end cells or frits 15 are provided to contain the material 30 and 32 in these enclosures. A conductive coating of electrically conductive conductors in a bar pattern derived by incrementally spaced and parallel conductors 22 separated by spacing 60 (see FIG. 2) are provided on the inner surface of plate glass 16. A similar array of electrical conductors 24 separated by spacing 64 (see FIG. 2) are provided on the upper surface of plate glass 18 in alignment with the bar pattern of conductors 22 on plate 16. The respective conductors 22 are extended beyond the enclosure to the LCD to provide terminal connections 23-1 . . . 23-N to external control circuits as will be described with FIG. 3. The conductors 24 on plate 18 are similarly extended but in the opposite direction to terminals 25-1 . . . 25-N for connection to external circuits also. The conductors 22 and 24 are transparent to light and when provided with preferably AC or, if desired, DC voltage will cause an excitation of one or more of the columns defined by the array of conductor pairs 22 and 24. When voltage is applied to terminals 23-1 and 25-1 and thence to the opposing conductors 22 and 24, the liquid crystal composition therebetween is excited to render the material defining the first column transparent to light in a manner known in the art.

In a similar manner the liquid crystal device 14 is provided with an array of conductors 26 and 28 in a bar fashion developed by incrementally spacing the conductors by spacings 64 and 66, respectively. The pattern of conductors 26 and 28 is disposed in orthogonal relation to the bar pattern defined by conductors 22 and 24 of the LCD 12. Terminals 27-1 . . . 27-5 and 29-1 . . . 29-5 are similarly extended beyond the crystal enclosure to provide connections to external circuits. By arranging the terminals to extend along opposite edges of the glass plates for the respective LCD's 12 and 14, a more compact structure is provided with a minimum possibility of terminals and wires undesirably touching each other.

It is thus seen that the structure shown in FIGS. 1 and 2 provides two liquid crystal displays arranged in a double-layer or back-to-back fashion between the controlling conductive patterns which are typically different for each of the two LCD layers 12 and 14. The stripes or bars of conductors in the patterns 22, 24, 26 and 28 are, for one embodiment, transparent while the glass plate 20 is reflective. For such an arrangement a viewer 70 in a light environment as seen along arrow 72 will see a reflected pattern of dots according to the manner in which the upper LCD 12 and lower LCD 14 are excited. By using a transparent glass plate 20, a viewer 70 positioned below plate 20 will view dots from that position. This is known as the transparent mode, while the first-described arrangement using a reflective plate 20 is known as the reflective mode. For either mode, when a selected column defined by a pair of opposing conductors 22 and 24 is activated, a horizontal window is open between plate 18 and 16. Furthermore, when the row pair conductors 26 and 28 are activated, vertical windows are opened to define dots whenever two sets of activated conductors in the two LCD layers 12 and 14 intersect. With this arrangement, the LCD 10 display can be multiplexed in a manner that is presently restricted to light emitting diode (LED) matrices.

For an illustration of how such an LCD matrix can be arranged to provide a dot matrix, reference is now made to FIG. 3. LCD 100 of FIG. 3 is formed of a double layer of LCDs similar to LCD 10 shown in FIGS. 1 and 2. LCD 100 is formed of the LCD 12 on top of the LCD 14. To simplify the drawing, only the common layer 18 is shown with the understanding that the top layer 16 and bottom layer 20 are used to form LCD 100. The LCD 12 is arranged into 14 columns (1–14) in which the conductive layers 24 are extended to terminals 25-1 . . . 25-14. The lower LCD 14 is arranged into 5 rows of conductors extended from the structure to provide terminals 27-1 . . . 27-5. Moreover, the bottom glass plate layer 20 of LCD 14 is arranged to be reflective, similar to FIG. 1, so that a viewer 70 in the environment of light 72 will see reflections of light from the bottom layer 20 through the activated LCD portions rendered transparent through the respective top and bottom layers of the LCD forming the dot matrix.

The LCD 100 is arranged with the spacings 60, 62, 64, and 66, shown in FIGS. 1 and 2, so that as it is viewed from the top, as seen in FIG. 3, dots of the dot matrix will be displayed when activated with dark margins or spaces therebetween. Furthermore, in order to enhance the viewing contrast of dots developed in the peripheral portions of LCD, a border 74 formed of a dark opaque masking material is provided. If desired, LCD material that is never energized and is thus left in an opaque state may be used, in the alternative, for the border 74.

It will be noticed that the LCD layer that is to function as the sequential or one-at-a-time portion of the display is preferably positioned nearest to viewer 70. This is done to reduce unnecessary light scattering that occurs in an LCD layer in which many cells are activated simultaneously as would the layer 14 serving to provide the "row mode" of operation. Thus layer 14 is positioned under layer 12 to thereby minimize such stray light from being seen by the viewer.

The dot matrix system of FIG. 3 is arranged so that the LCD 100 is activated by a 1-of-14 decoder 50 and a memory and control circuit 52. Decoder 50 provides for a one-at-a-time selection of any one of the 14 columns terminated at the respective terminals 25-1 . . . 25-14. Decoder 50 is a conventional decoder including suitable LCD drivers which provide an AC voltage of sufficient voltage to activate the selected pairs of conductors (22,24) in the upper LCD layer 12 defining the LCD columns 1–14. Decoder 50 under control of memory and control circuit 52 is operated via bus 54 to select a desired one of columns 1 to 14 in any desired sequence.

Memory and control circuit 52 functions to activate simultaneously a plurality of selected rows in the lower LCD layer 14 that cross with the selected column activated by decoder 50 to define one or more dots. Circuit 52 is formed in the present embodiment of a conventional bit memory, and associated LCD drivers to energize the respective LCDs with an AC voltage of sufficient magnitude to activate the LCDs. Moreover, memory and control circuit 52 functions to coordinate the timing of the decoder 50 and the display memory portion of the circuit 52. For other embodiments, memory and control circuit 52 may be provided with a character generator in addition to or, in place of, a bit generator of the type used for the above-described embodiment which provides a simple dot matrix. By using the character generator the invention can be used to develop classical graphic displays of alpha-numeric displays.

Memory and control circuit 52 provides parallel row signals to selected terminals 27-1 . . . 27-5 in synchronism with one of the selected columns 1–14 via decoder 50 and bus 54. Decoder 50 selects any column N of one of N columns, in this case 1–14 columns, using a code, for example, of four bits for one of 16 possible columns. When a column or a row is activated, an entire stripe becomes transparent. For example, when column 9 is selected, rows 2 and 4 must be active in order to effect the two light dots as shown in FIG. 3. For this description it should be understood that the light spots represent a vertical set of active LCD dots defined by the corresponding activated portions of both the LCD 12 and LCD 14 of LCD 100. Dark spots indicate one or both of the corresponding LCD dots are not activated.

In operation, each column is selected sequentially by decoder 50 by activating the proper stripe in the upper LCD 14 of LCD 100. Furthermore, the required rows are simultaneously selected in parallel and in synchronism with the column selection. For example, if it is desired to display the symbol "RCA" as illustrated in FIG. 3 on a 5 by 14 LCD dot matrix display, initially column 1 is selected and rows 1–5 are activated. This provides the solid light line shown in column 1. Column 2 is then selected and rows 1 and 3 only are activated to effect the first and third light dots only in column 2. This multiplexing procedure is followed through the 14 columns. The activation of the LCD cells are multiplexed at a rate sufficient to refresh each dot often enough to maintain a visible display "RCA" as shown in FIG. 3.

In the illustration of FIG. 3, the dots are developed in apparent non-touching relationship by spacing the conductors 22, 24 and 26. If smaller or touching dots are desired, the vertical and horizontal conductor patterns would be more closely spaced.

In the embodiment of FIG. 3 the clocking portion of circuit 52 is designed for an array of 5 by 14 columns by having 14 clocking periods, each clocking period activating a particular column. For such an arrangement there will be a given level of brightness as developed during the time that each column has been activated and is waiting for a second activation on the repeat or refresh cycle. To provide better brightness control, it may be desirable to change the clocking periods to something in the order of five cycles by reversing the addressing of the matrix by using five window controls for the five rows and each of the 14 columns energized on a data bit basis. Thus, a 1 of 5 decoder 50 is used to excite the rows 1 to 5 while the circuit 52 is applied to the columns 1 to 14. In that way, a data bit input is addressed to the columns with the decoder control to the rows. Better refreshment of the transparency is achieved by refreshing the display every five cycles instead of every 14. However, in such a system there would be more complex controls required than shown. For example, by such an arrangement an additional decoder 50 of five inputs and an additional memory and control circuit 52 requiring 14 inputs is needed. Otherwise the system operates as described hereinabove.

The invention can be used to develop very complex and dense dot matrices for generating displays in alphanumeric form or any desired graphical presentation. Consider a dot matrix display of 100×100 dots. In order to energize such a matrix of dots, many leads to conduct the energizing signals to the LCD are required. Assuming each dot is controlled individually, 20,000 leads would be required. Reduction of the leads required can be achieved by judicial clocking and multiplexing arrangements. Present designs for conventional single layer LCD dot matrix arrays would still require 200 (i.e., 100+100) leads but would nevertheless be difficult to implement. The difficulty in such an implementation resides in the need for 100 clocking waveforms; I know of no such clocking system in the present state of the art.

The present invention of a double-layer LCD for a similar 100×100 dot display requires only 400 leads (i.e., 100×2+100×2). The clocking and multiplexing requirements of an LCD matrix using the present invention, accordingly, are very simple as illustrated in the embodiment of FIG. 3.

Moreover, the present invention allows for refreshment of a portion of the entire display as, for example, displaying and refreshing only the letter "C" of "RCA" illustrated in FIG. 3. In conventional LCD displays such a partial display cannot be provided since, as indicated above, an LCD of conventional form cannot be multiplexed or addressed on a cell by cell basis. Furthermore, a display utilizing the invention can be modified by providing the addressing program to effect a dwelling time for activation of a selected one or more dots of the matrix according to a desired effect for graphic display and the like.

While the embodiment described above and illustrated in FIGS. 1, 2, and 3 are formed of LCD's without polarizing plates, it will be apparent to those skilled in this art that any form of LCD may be used to develop the double layer liquid crystal device for a dot matrix according to the invention. A suitable LCD using polarizing means for example is described in the aforementioned U.S. Pat. No. 4,139,278.

What is claimed is:

1. A liquid crystal device for a dot matrix display comprising
   closely spaced first, second, and third glass plates maintained apart with a seal to define a first enclosure between the first and second plates and a second enclosure between the second and third plates,
   liquid crystal compositions in each of said enclosures,
   a conductive coating in a first bar pattern on the facing surfaces of the first and second glass plates,
   a second bar pattern of a conductive coating on the facing surfaces of the second and third glass plates,
   the first and second bar patterns being disposed on the respective surfaces of the plates as a pattern of incrementally spaced and parallel conductors, the first pattern being arranged in spaced orthogonal relationship to the second pattern to provide a dot matrix as viewed from the exposed surfaces of the first or second plates, and
   terminal means connected to said conductive pattern for coupling to electrical energizing means for energizing a preselected one or more sets of conductors to cause the liquid crystal composition to pass light through both enclosures of the device to display one or more dots according to the preselected energization pattern;
   wherein said terminal means includes terminals extending from opposite edges of the respective adjacent plate surfaces, and further includes:
   first electrical energizing means connected to said terminals to energize a selected pair of conductors of the first enclosure to render transparent to light the liquid crystal composition in first enclosure; and
   a second electrical energizing means for simultaneously electrically energizing a selected one or more pairs of conductors of the second enclosure to render transparent to light the liquid crystal composition of the second enclosure to display thereby a series of dots along the first pattern crossing the second energized pattern.

2. A device according to claim 1 wherein the conductive patterns are transparent to light and the first, second and third glass plates are transparent to light.

3. A device according to claim 1 wherein the conductive patterns on the surfaces of the first second and third plates are transparent to light and the first or third plate is reflective to light.

4. A liquid crystal device according to claim 1 wherein the conductive patterns are arranged such that each of the dots in the dot matrix appears to touch each other.

5. A liquid crystal device according to claim 1 wherein each of the dots of said matrix are arranged to appear to be spaced within corresponding rows and columns of said spaced orthogonally arranged conductor patterns.

6. A liquid crystal device according to claim 1 wherein the first energizing means is a decoder for energizing a selected set of parallel conductors of the first bar patterns and said second energizing means is a control circuit for energizing one or more of the parallel conductors of the second bar patterns.

* * * * *